(12) United States Patent
Wijnen et al.

(10) Patent No.: US 8,690,421 B2
(45) Date of Patent: Apr. 8, 2014

(54) APPARATUS AND A METHOD FOR MEASURING THE BODY CORE TEMPERATURE FOR ELEVATED AMBIENT TEMPERATURES

(75) Inventors: Merijn Wijnen, Eindhoven (NL); Marcus Benedictus Hoppenbrouwers, Eindhoven (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 876 days.

(21) Appl. No.: 12/668,385

(22) PCT Filed: Jul. 9, 2008

(86) PCT No.: PCT/NL2008/050462
§ 371 (c)(1),
(2), (4) Date: Jan. 8, 2010

(87) PCT Pub. No.: WO2009/008722
PCT Pub. Date: Jan. 15, 2009

(65) Prior Publication Data
US 2010/0202488 A1 Aug. 12, 2010

(30) Foreign Application Priority Data
Jul. 10, 2007 (EP) .................................. 07112173

(51) Int. Cl.
*G01K 13/00* (2006.01)
*G01K 7/00* (2006.01)
*G01K 1/00* (2006.01)

(52) U.S. Cl.
USPC .............. 374/29; 374/208; 374/163; 600/549

(58) Field of Classification Search
CPC ........................... G01K 1/165; G01K 13/002; G01K 7/04; A61B 5/01
USPC ............................................ 374/29, 208, 163
See application file for complete search history.

(56) References Cited

U.S. PATENT DOCUMENTS 4,488,558 A * 12/1984 Simbruner et al. ........... 600/376
4,859,078 A * 8/1989 Bowman et al. ................ 374/44

(Continued)

FOREIGN PATENT DOCUMENTS

GB 1 304 282 A 1/1973
WO WO 02/066946 A 8/2002

OTHER PUBLICATIONS

International Search Report for PCT/NL2008/050462 dated Oct. 9, 2008.

*Primary Examiner* — Mirellys Jagan
(74) *Attorney, Agent, or Firm* — Leydig, Voit & Mayer, Ltd.

(57) ABSTRACT

The invention relates to an apparatus (10) for measuring a temperature of the core of a body for elevated ambient temperatures, comprising a heat stream sensor (14) having a surface adapted to be positioned in contact with a surface S of the body for detecting a body's inwards heat stream, said sensor being thermally insulated on all its other surfaces from the surroundings, a cooling element (15) for cooling the heat stream sensor, a heat buffer (13) being thermally insulated from surroundings and being arranged in a heat conducting communication with the cooling element, a control unit (19) for switching on the cooling element for compensating the body's inwards heat stream and a temperature sensor (20) for measuring the temperature of the body surface.

7 Claims, 1 Drawing Sheet

(56) References Cited

U.S. PATENT DOCUMENTS

| | | | |
|---|---|---|---|
| 5,803,915 A * | 9/1998 | Kremenchugsky et al. | 600/549 |
| 6,220,750 B1 * | 4/2001 | Palti | 374/164 |
| 7,597,668 B2 * | 10/2009 | Yarden | 600/549 |
| 2004/0076215 A1 * | 4/2004 | Baumbach | 374/29 |
| 2007/0295713 A1 * | 12/2007 | Carlton-Foss | 219/497 |
| 2008/0300819 A1 * | 12/2008 | Koch | 702/131 |
| 2010/0121217 A1 * | 5/2010 | Padiy et al. | 600/549 |
| 2011/0249701 A1 * | 10/2011 | Bieberich et al. | 374/163 |
| 2011/0317737 A1 * | 12/2011 | Klewer et al. | 374/29 |

* cited by examiner

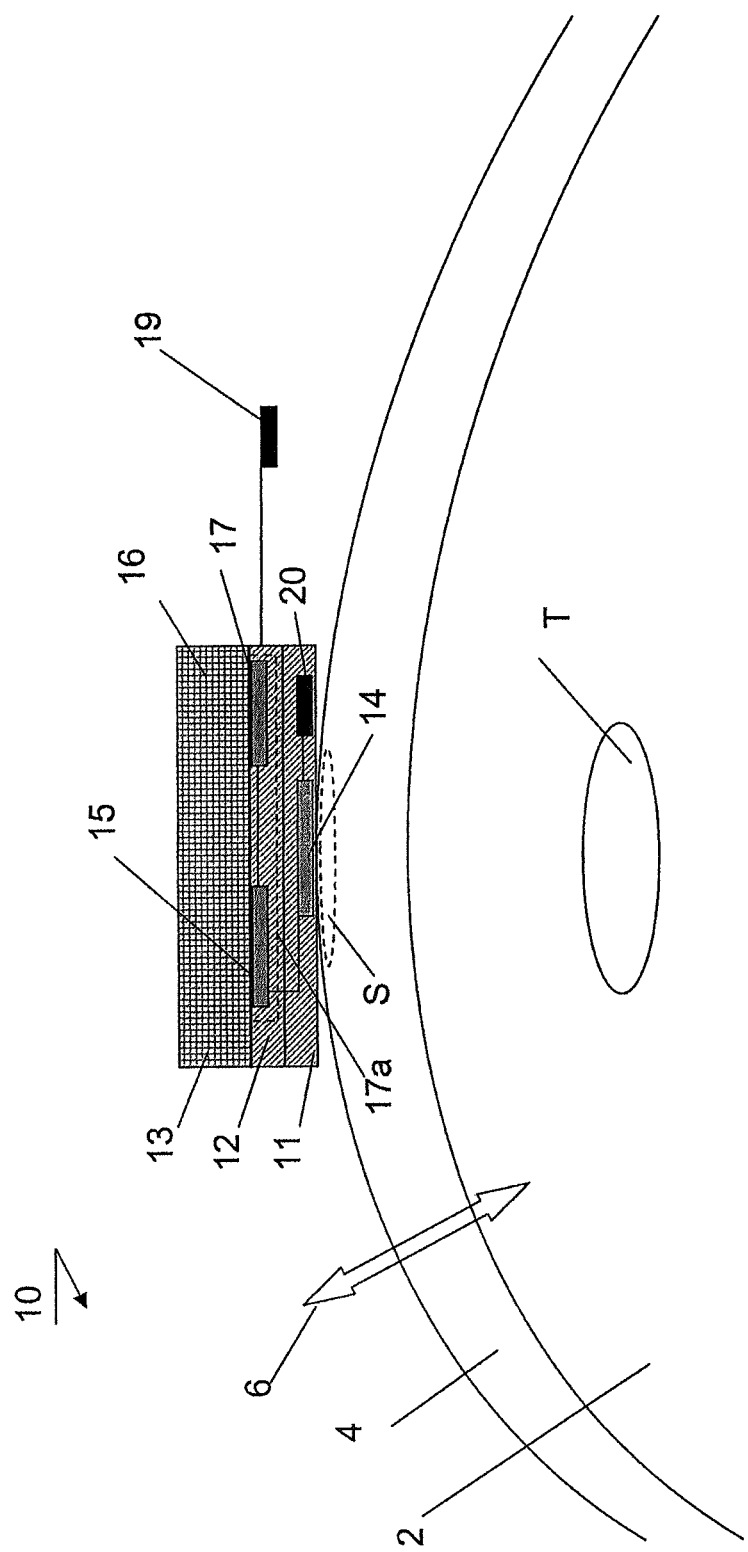

APPARATUS AND A METHOD FOR MEASURING THE BODY CORE TEMPERATURE FOR ELEVATED AMBIENT TEMPERATURES

FIELD OF THE INVENTION

The invention relates to an apparatus for measuring a temperature of the core of a body for elevated ambient temperatures.

The invention further relates to a method of measuring a temperature of the core of a body for elevated ambient temperature conditions.

BACKGROUND OF THE INVENTION

An embodiment of a device for measuring body's core temperature is known from U.S. Pat. No. 6,220,750 B1. The known apparatus comprises a capsule, the inside of which is heat conductive, which has a surface adapted to be placed in contact with the surface of the body the core temperature of which is conceived to be measured, said capsule being thermally insulated on all its other surfaces. The known apparatus further comprises a heating element for heating the inside of the capsule and a temperature sensor for measuring the temperature inside the capsule, whereby the heating element is actuatable by a control unit arranged to switch on the heating element for compensating the thermal flux emanating from the body in an outwards direction.

The known apparatus is based on the insight that the body which temperature is to be measured has an inside core with a substantially constant temperature and an outer surface from which the heat is dissipated into the surrounding when the ambient temperature is lower than the body core temperature. It is further assumed that the body comprises an outer shell between the core and the surface wherein the temperature gradually decreases from that of the core to that of the surface. In the case of a steady heat flow and a constant conductivity throughout the shell, said temperature decreases. It is further assumed that since there are no heat sources in the body except the core, the temperature falls as a monotonous decreasing function from the core to the surface. Under these conditions, in steady state, if it is found that two intermediate points along a path between two extreme points have the same temperature, the two extreme points must be at the same temperature. The operation of the known device is based on the insight that if a path for heat flow can be created between the core of the body, the temperature of which is measured and points outside the body, and the flow of heat along this path can be controlled so that two points of said path are at the same temperature, under thermal equilibrium, this indicates that heat flow has ceased and their temperature will be the same as that of the core. This method is also referred to as a zero-flux method for determining the core temperature.

It is a disadvantage of the known apparatus that it is only usable for situation when the ambient temperature is lower than the body's core temperature.

SUMMARY OF THE INVENTION

It is an object of the invention to provide an apparatus for measuring a body's core temperature in conditions of an elevated ambient temperature.

To this end the apparatus according to the invention comprises:

a heat stream sensor having a surface adapted to be positioned in contact with a surface of the body for detecting a body's inwards heat stream, said sensor being thermally insulated on all its other surfaces from the surroundings;

a cooling element for cooling the heat stream sensor;

a heat buffer being thermally insulated from surroundings and being arranged in a heat conducting communication with the cooling element;

a control unit for switching on the cooling element for compensating the body's inwards heat stream;

a temperature sensor for measuring the temperature of the body surface.

The invention is based on the insight that by providing a suitable heat buffer for absorbing parasitic heat generated by a cooling element a zero-flux method may be successfully applied to conditions with the elevated ambient temperature. Preferably, the heat buffer comprises a phase change material. More preferably, paraffin compounds or hydrated salt based materials are selected for the phase change material.

In a further embodiment the apparatus according to any one of the preceding claims, further comprises a heating element arranged in a second heat conductive communication with the heat stream sensor for heating the heat stream sensor, wherein the control unit being further arranged for switching on the heating element for a body's outwards heat stream, the temperature sensor being further arranged to measure the temperature of the heating element.

It is found to be advantageous to provide an apparatus for measuring a body's core temperature, which can be versatile with respect to the ambient temperature. Preferably, the heating element and the cooling element are realized by a Peltier element. In accordance with this technical measure a compact apparatus is provided. It this case it is found to be advantageous to let the first heat conductive communication and the second heat conductive communication be the same so that a sole heat conductive path is used for heating and for cooling purposes.

A method according to the invention comprises the steps of:

detecting a body's inwards heat stream through a surface area of the body;

compensating the inwards heat stream by cooling the surface area using a cooling element;

collecting heat generated by the cooling element in a heat buffer being thermally insulated from surroundings;

measuring the temperature of the cooling element.

In a preferred embodiment of the method, a heating element is provided, so that the method further comprises the steps of:

detecting a direction of the heat stream in the body;

activating the heating element or the cooling element in response to the detected direction.

In a preferred embodiment of the method according to the invention a Peltier element is provided for the cooling element and for the heating element. Accordingly, a compact and reliable body's core temperature meter is provided.

These and other aspects of the invention are discussed in more detail with reference to the figure.

BRIEF DESCRIPTION

FIG. 1 presents in a schematic way an embodiment of the apparatus for measuring a core temperature of the body according to the invention.

DETAILED DESCRIPTION

An apparatus 10 for measuring a core temperature of the body according to the invention is conceived to be positioned on a suitable surface area S of a body 2 in order to measure a core temperature T. The apparatus 10 according to the invention is based on the insight that the body 2 comprises a shell 4 through which a heat exchange 6 occurs with the surroundings. In case when the temperature of the surroundings is smaller than the temperature of the body 2, the heat is dissipated in an outward direction with respect to the body 2. In case when the temperature of the surroundings is greater than the temperature of the body 2, the heat flux is directed in an inwards with respect to the body 2.

The apparatus 10 according to the invention comprises a heat flux sensor 14 arranged in a suitable thermally insulating housing 11. The heat flux sensor is arranged to determine a direction of the heat transfer. In order to measure the core temperature of the body 2 using a zero flux method, particularly in circumstances when the ambient temperature is greater than the core temperature T, the apparatus according to the invention comprises a cooling element 15 arranged in a heat conductive communication with the heat flux sensor 14. The cooling element may be actuatable by an external control unit 19. Preferably, also the cooling element is provided in a suitable thermally insulating housing 12. By cooling the heat flux sensor 14 a zero net temperature flux is obtained between the shell 4 and the apparatus 10. The temperature, measured on the surface S using a suitable meter 20, for example a thermocouple, corresponds to the core temperature T of the body. Preferably, the temperature meter 20 is arranged between the surface S and the heat flux sensor 14. This has an advantage of more accurate temperature measurement.

It is appreciated that the cooling element 15 usually operates to cool one surface while generates heat on another surface. Such parasitic heat may disturb the operation of the apparatus 10 when not taken case of. For this purpose the apparatus 10 further comprises a heat buffer 13, being thermally isolated from the surroundings and being arranged to collect parasitic heat generated by the cooling element 15. Preferably, the heat buffer comprises a phase change material, more preferably a material having a higher phase transition temperature than a temperature conceived to be measured. Suitable low phase change materials comprise paraffin compounds or hydrated salt based materials, as they enable accurate operation of the apparatus 10 in the range of temperatures of at least 40-150 degrees Celsius, or even up to higher temperatures.

Preferably, the apparatus 10 further comprises a heating element 17 arranged for heating the heat flux sensor when the ambient temperature is lower than a core temperature T. In this way a versatile apparatus for measuring core temperature T is enabled, which is accurately operating in a wide range of ambient temperatures. Preferably, the heating element 17 and the cooling element 15 form a cooling surface and a heating surface of a Peltier element 17a. In this way a versatile apparatus 10 with simplified architecture is provided. In this case the control unit 19 is adapted for switching the cooling element 15 or the heating element 17 in dependence of a direction of the heat flux 6. It is noted that a cabling between controller 19 and the apparatus 10 may be of any length.

While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. An apparatus for measuring a temperature of a core of a body for elevated ambient temperatures, comprising:
    a heat stream sensor having a first surface adapted to be positioned in contact with a surface of the body for detecting a body's inwards heat stream, the heat stream sensor being thermally insulated on all surfaces other than the first surface;
    a cooling element for cooling the heat stream sensor, wherein the heat stream sensor, in use, contacts a surface of the body while the apparatus is positioned to measure the temperature of the core;
    a heat buffer thermally insulated from surroundings and arranged in a first heat conducting communication with the cooling element;
    a control unit for switching on the cooling element for compensating the body's inwards heat stream;
    a temperature sensor, separate from the heat stream sensor, positioned, in use, to measure a temperature of the body surface.

2. The apparatus according to claim 1, wherein the heating element and the cooling element are embedded in a Peltier element.

3. The apparatus according to claim 1, further comprising a heating element arranged in a second heat conducting communication with the heat stream sensor for heating heat stream sensor, the control unit being further arranged for switching on the heating element for a body's outwards heat stream, and the temperature sensor being further arranged to measure the temperature of the heating element.

4. The apparatus according to claim 3, wherein the first heat conducting communication and the second heat conducting communication are the same.

5. The apparatus according to claim 1, wherein the heat buffer comprises a phase change material.

6. The apparatus according to claim 5, wherein the phase change material is selected from a group of phase change materials having a higher phase change temperature than a temperature conceived to be measured by the apparatus.

7. The apparatus according to claim 6, wherein the phase change material is taken from the group of phase change materials consisting of: paraffin compounds and hydrated salt based materials.

* * * * *

UNITED STATES PATENT AND TRADEMARK OFFICE
CERTIFICATE OF CORRECTION

PATENT NO.        : 8,690,421 B2
APPLICATION NO.   : 12/668385
DATED             : April 8, 2014
INVENTOR(S)       : Wijnen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Twenty-ninth Day of September, 2015

Michelle K. Lee
*Director of the United States Patent and Trademark Office*